US012304045B2

(12) United States Patent
Rohrmoser

(10) Patent No.: US 12,304,045 B2
(45) Date of Patent: May 20, 2025

(54) ELECTRICALLY-MECHANICALLY OPERATED TOOL FOR DRIVING FASTENERS

(71) Applicant: Florian Rohrmoser, Großarl (AT)

(72) Inventor: Florian Rohrmoser, Großarl (AT)

(73) Assignee: INNOVATION NETWORK AUSTRIA DIENSTLEISTUNGS-GMBH, Thalheim Bei Wels (AT)

( * ) Notice: Subject to any disclaimer, the term of this patent is extended or adjusted under 35 U.S.C. 154(b) by 67 days.

(21) Appl. No.: 17/842,045

(22) Filed: Jun. 16, 2022

(65) Prior Publication Data

US 2022/0379448 A1 Dec. 1, 2022

Related U.S. Application Data

(63) Continuation of application No. PCT/AT2020/060469, filed on Dec. 16, 2020.

(30) Foreign Application Priority Data

Dec. 18, 2019 (AT) .............................. A 51105/2019

(51) Int. Cl.
*B25C 5/15* (2006.01)
*B25C 5/16* (2006.01)

(52) U.S. Cl.
CPC .............. *B25C 5/15* (2013.01); *B25C 5/1617* (2013.01)

(58) Field of Classification Search
CPC ............ B25C 5/15; B25C 5/1617; B25C 1/06
See application file for complete search history.

(56) References Cited

U.S. PATENT DOCUMENTS 6,145,724 A * 11/2000 Shkolnikov ............... B25C 1/08 227/8
7,383,974 B2 * 6/2008 Moeller .................... B25C 1/08 227/8

(Continued)

FOREIGN PATENT DOCUMENTS

DE 10 2010 063 964 6/2012
EP 1 935 572 6/2008

(Continued)

OTHER PUBLICATIONS

International Search Report issued Mar. 12, 2021 in International (PCT) Application No. PCT/AT2020/060469.

*Primary Examiner* — Thomas M Wittenschlaeger
*Assistant Examiner* — Katie L Gerth
(74) *Attorney, Agent, or Firm* — Wenderoth, Lind & Ponack, L.L.P.

(57) ABSTRACT

A tool includes a mechanical energy storage such as a helical spring, and an ejecting device to be linearly moved between a clamping position and an ejecting position. The ejecting device has a driver element and a shooting device, and an electric motor and a spindle drive driven by the electric motor converts a rotational movement of the electric motor into a linear movement of the ejecting device. A control device controls the rotation of the electric motor, and the ejecting device can move toward the clamping position by rotation of the spindle drive in a first direction of rotation. A locking device can lock the shooting device in the clamping position, and the shooting device can be released and moved toward the ejecting position by actuating the locking device. The driver element can be moved toward the ejecting position by rotating the spindle drive in a second direction.

31 Claims, 11 Drawing Sheets

(56) References Cited

U.S. PATENT DOCUMENTS

| | | | | |
|---|---|---|---|---|
| 7,520,414 | B2 | 4/2009 | Blessing et al. | |
| 7,992,756 | B2 | 8/2011 | Franz et al. | |
| 8,505,798 | B2 * | 8/2013 | Simonelli | B25F 5/02 227/126 |
| 10,442,066 | B2 * | 10/2019 | Nishikawa | B25C 7/00 |
| 10,723,005 | B2 * | 7/2020 | Meyer | B25C 1/06 |
| 11,491,625 | B2 * | 11/2022 | Shige | B25C 1/06 |
| 2005/0167465 | A1 * | 8/2005 | Llewellyn | B25C 5/15 173/117 |
| 2006/0108391 | A1 * | 5/2006 | Leasure | B25C 1/047 227/120 |
| 2008/0017689 | A1 * | 1/2008 | Simonelli | B25C 1/06 227/132 |
| 2008/0210736 | A1 | 9/2008 | Blessing et al. | |
| 2010/0089963 | A1 | 4/2010 | Franz et al. | |
| 2011/0303428 | A1 * | 12/2011 | Roth | B25C 1/008 173/1 |
| 2011/0303725 | A1 | 12/2011 | Schaer et al. | |
| 2012/0153001 | A1 | 6/2012 | Bertsch et al. | |
| 2012/0160888 | A1 | 6/2012 | Schiestl | |
| 2019/0039219 | A1 * | 2/2019 | Suarez | B25C 5/1606 |
| 2020/0282535 | A1 * | 9/2020 | Shige | B25C 5/15 |
| 2020/0298387 | A1 * | 9/2020 | Akiba | B25C 1/008 |
| 2021/0347023 | A1 * | 11/2021 | Carrier | B25C 1/008 |

FOREIGN PATENT DOCUMENTS

| | | |
|---|---|---|
| EP | 2 177 321 | 4/2010 |
| EP | 2 397 260 | 12/2011 |
| EP | 2 397 269 A2 | 12/2011 |
| EP | 2 465 641 | 6/2012 |
| EP | 2 397 269 B1 | 9/2014 |
| JP | 56-21790 | 2/1981 |

* cited by examiner

ELECTRICALLY-MECHANICALLY OPERATED TOOL FOR DRIVING FASTENERS

BACKGROUND OF THE INVENTION

The present invention relates to a tool for driving in fasteners, comprising

- a mechanical energy store for storing mechanical energy, in particular with a helical spring,
- an ejecting device, which is able to be linearly moved in a guide device between a clamping position and an ejecting position, by which energy from the energy store is able to be transferred to the fastener, wherein the ejecting device has a driver element and a shooting device,
- an electric motor and a spindle drive driven by the electric motor for converting a rotational movement of the electric motor into a linear movement of the ejecting device, wherein the driver element of the ejecting device is able to be connected to the spindle drive and is able to be releasably coupled to the shooting device, and wherein a control device is provided, by which the direction of rotation of the electric motor is able to be controlled, and wherein the ejecting device is able to be moved in the direction toward the clamping position by rotation of the spindle drive in a first direction of rotation, and wherein the mechanical energy store is able to be loaded by the movement of the ejecting device in the direction toward the clamping position,
- a locking device for locking the shooting device in the clamping position, wherein the locking is able to be released and the shooting device is able to be moved in the direction toward the ejecting position by actuating the locking device.

The invention also relates to a method for driving in fasteners with a tool of this type.

Tools or devices for driving in fasteners are known in the state of the art. Devices of this type usually use combustion gases or operate pneumatically in order to transfer energy to the fastener.

These pneumatically operated or gas-powered tools are very heavy and are unsuitable for working in terrain which is difficult to access, for example due to the compressor required. Handling of the tool is also made difficult by a compressed air hose. In the case of gas-powered tools, gas cartridges accumulate as waste and exhaust gases are emitted. The same is also true of tools which operate with the combustion gases of a fuel. In addition, the driving-in devices which operate with combustion gases need to be serviced at regular intervals in order to enable smooth operation.

Due to these disadvantages, in agriculture when working in terrain which is difficult to access it is still common to rely on hammers or similar tools. However, with activities which require the repeated driving in of fasteners, such as e.g. staples or nails, driving in by hand is exhausting and enormously time-consuming.

Electromechanical tools for driving in fasteners are also known in the state of the art. EP 2 397 269 B1 describes a device for driving a fastener element into a substrate, with a mechanical energy store which is loaded with the aid of electrical energy, wherein the electric motor is supplied with decreasing energy while energy is being stored in the mechanical energy store. Through supplying the electric motor with decreasing energy, on the one hand the loading procedure of the mechanical energy store is unnecessarily lengthened, and on the other hand, due to the utilization of the entire speed range of the motor, in that combination in which the maximum load torque through the mechanical energy store is higher than the maximum drive torque of the motor, the lifespan of the motor is negatively affected.

EP 1 935 572 A1 describes a hand-guided driving device for fastener elements with a mechanical energy store in the form of a spring and a clamping device with a spindle drive. The decentralized arrangement of the clamping device and of the locking device can result in wedging and other problems in the guiding of the shooting device.

SUMMARY OF THE INVENTION

The object of the present invention is therefore to create a convenient tool for driving in fasteners, in particular staples, which avoids the disadvantages of the state of the art.

The tool according to the invention possesses a mechanical energy store for storing mechanical energy. This serves to make it possible for the use of pneumatic devices or those which use combustion gases of a fuel to be dispensed with. Furthermore, the tool possesses an ejecting device by which energy stored in the mechanical energy store is able to be transferred to the fastener. The movement of the ejecting device between an ejecting position and a clamping position is guided by a guide device. In addition, the tool possesses an electric motor which drives a spindle drive. This serves to convert the rotational movement of the electric motor into a linear movement of the ejecting device. The ejecting device has a driver element and a shooting device, wherein the driver element of the ejecting device is able to be connected to the spindle drive and is able to be releasably coupled to the shooting device.

Furthermore, a control device is provided, which can control the direction of rotation of the electric motor. Through rotation of the spindle drive in a first direction of rotation, the ejecting device can be moved in the direction toward the clamping position, wherein the mechanical energy store is loaded by this movement of the ejecting device. Furthermore, a locking device for locking the shooting device in the clamping position is provided. Through actuation of the locking device, the locking is able to be released and the shooting device is able to be moved in the direction toward the ejecting position.

According to the invention, the driver element is able to be moved in the direction toward the ejecting position through rotation of the spindle drive in a second direction of rotation and the locking of the shooting device is able to be released through the movement of the driver element in the direction of the ejecting position. It is thereby possible that, by means of the driver element, both the mechanical energy store can be loaded and the locking can be released, as a result of which the tool can be designed with fewer individual parts and in particular the possibility of a symmetrical, coaxial construction results. The actuation for firing the shooting device by changing the direction of rotation of the spindle drive is able to be realized very simply and is less prone to faults due to the electric motor.

The locking device can have at least one rotatably mounted catch element, which is preferably spring-assisted, spring-loaded or resiliently mounted and serves for locking the shooting device in the clamping position. The catch element can, for example, be supported by a sprung disk or tensioned by an annular spring. A preferably symmetrical arrangement of several catch elements around the spindle drive has proved to be particularly advantageous. It can also be provided that the axis of rotation of the catch element is arranged perpendicular to the axis of rotation of the spindle drive. Furthermore, it can be provided that the axis of rotation of the catch element does not run through the axis of rotation of the spindle drive.

Through the possible formation of the locking device as a mechanical component which holds the shooting device in the clamping position without additional power supply and is also able to be released without the supply of electrical energy, accidental firing of the shooting device can be virtually ruled out even in the case of deficient power supply. In addition, the use of a purely mechanical ejecting device makes it possible to save energy. This is advantageous in particular when the tool is to be kept in the clamped state for a long time without being fired. If more than one catch element is used, a redundancy is created in case a catch element fails. The at least one catch element can have a curved inner contour and/or a detent, optionally with a chamfered region, on the side facing the mechanical energy store.

The locking device can be released by disengaging the catch element or elements from the shooting device. This can be effected by rotating the catch element about its axis of rotation. The locking device can be released more easily due to the chamfered region of the detent because the rotational movement of the catch elements is initiated more easily. Furthermore, the chamfered region of the detent can, among other things, provide for a low-wear operation of the catch elements and thus of the locking device.

According to an embodiment, the shooting device is formed substantially cylindrical and has a first wall element facing the clamping position and a second wall element facing the ejecting position. The first and/or the second wall elements are formed as stop surfaces for the driver element. In this case, a force is able to be applied to the stop surface by the driver element for releasing the locking. A symmetrical construction of the ejecting device can thereby be realized.

Due to the direction of movement of the driver element in the direction toward the ejecting position, the force acts on the stop surface and thus on the shooting device likewise in the direction toward the ejecting position. Due to the action of this force, the necessary holding force, which the locking device has to exert on the shooting device in order that it is held in the clamping position, becomes greater. As soon as the force exerted by the driver element on the stop surface exceeds a certain threshold value, the shooting device can no longer be held in the clamping position by the locking device and, due to the energy transferred from the mechanical store, the shooting device moves at high speed in the direction toward the ejecting position, where a fastener is then launched. Due to its movement in the direction toward the ejecting position, the driver element thus presses the shooting device out of the locking, whereupon it converts the energy transferred from the mechanical store into kinetic energy (apart from losses due to friction), which can then be used to drive a fastener into a substrate.

The shooting device can have at least one support strut via which the first wall element and the second wall element are connected to one another. Preferably, several support struts connect the first and the second wall element to one another. These are preferably arranged symmetrically around the spindle drive.

It is also possible for the support strut(s) and one wall element to be formed as one part. Likewise, it is possible for both wall elements and the support strut(s) to be formed as one part.

In a preferred embodiment of the invention, at least one sensor is provided for detecting the position of the ejecting device. In this case, a very wide variety of sensors, known per se in the state of the art, can be used.

Through the precise detection of the position of the ejecting device, it is possible to position the driver element according to the position of the ejecting device, even after the power supply has failed, in order to avoid material damage in the case of a possible release of the locking device.

The control device can be formed in such a way that the direction of rotation of the spindle drive is changed when a first position of the ejecting device is reached and/or the electric motor is switched off when a second position of the ejecting device is reached. It is thereby possible for the direction of rotation of the spindle drive to be changed as soon as the clamping procedure is completed and the shooting device is locked. The driver element can thus be moved in the direction toward the ejecting position directly after the clamping procedure in order to be able to fire a shot with little or no time delay. The control device can also regulate the rotational speed of the electric motor, wherein the electric motor is preferably operated at a constant rotational speed during the loading of the energy store.

A stop element can be provided for the mechanical energy store, wherein the mechanical energy store is mounted between the stop element and the shooting device. The mechanical energy store is preferably formed as a helical spring, which can be supported on the stop element.

In this case, the spindle drive is mounted, preferably centrally, in the stop element.

The spindle drive can be arranged, preferably centered, in the mechanical energy store, preferably within the helical spring.

The spindle drive can be arranged centered in the ejecting device, preferably centered in the driver element, and/or centered in the shooting device.

A symmetrical construction of the essential parts of the tool can be made possible by a central, i.e. centered, positioning of the spindle drive in the mechanical energy store and/or in the ejecting device. This has the advantage that it results in an even loading of the particularly stressed parts of the device and no radial moments arise. Through the arrangement of the spindle drive within the mechanical energy store, a space-saving construction of the tool can be made possible.

The driver element is able to be arranged at least partially in the mechanical energy store, preferably within the helical spring, during the movement in the direction toward the clamping position. Such an arrangement enables a space-saving construction since the empty space, in particular within the helical spring, can be utilized. In addition, such an arrangement would offer the advantage that a coaxial construction is possible, as a result of which radial moments on the spindle drive can be avoided.

The spindle drive can have a spindle nut, and the driver element can have a tension disk which is able to be connected to the spindle nut, wherein the tension disk is able to be arranged within the shooting device, preferably between the first and the second wall elements.

On the outside of the ejecting device, preferably on the second wall element, a damping element can be arranged for retarding the shooting device. In this case, the damping element can consist of a resilient material. However, it is also conceivable that the damping properties of the damping element are able to be set, e.g. by using an adjustable air damper, which, for settability, is preferably fastened stationary on the firing pin seat. As a result, the penetration depth of the fasteners could be set depending on the substrate. Such a setting possibility would enable an only partial driving in of the fasteners. As a result, the tool can also be used to fix with a fastener more sensitive articles or objects, which would be destroyed or at least damaged in the case of driving in with full force.

The shooting device can have a firing pin with which a fastener located in a launch position is able to be driven into a substrate.

The guide device can have several guide bars, preferably arranged outside the ejecting device, which extend from the stop element in the direction toward the ejecting position. Because the guide device possesses several, preferably four or more, guide bars, the risk that the ejecting device will jam or wedge is kept low. Furthermore, the use of several guide bars offers the advantage that, in the case of a symmetrical arrangement of the guide bars, no tilting moment arises in the case of material failure of the shooting device, in particular in the firing pin, and thus consequential damage in the tool can be prevented.

The tool can have an electrical energy store for driving the electric motor. Through the use of an electrical store it is possible to operate the tool independently of a power supply. With appropriate sizing of the electrical store, it is possible to use the device for one or more working days without additional power supply. As a result, the tool is attractive for working in rough terrain.

The tool can have a magazine for storing fasteners.

The object of the invention is also achieved by a method in which the ejecting device is moved by the spindle drive in the direction toward the clamping position for loading the mechanical energy store, and the shooting device is held by the locking device when the clamping position is reached. According to the invention, the driver element is moved by the spindle drive in the direction toward the ejecting position to release the locking device.

For this purpose, through a movement of the driver element in the direction toward the ejecting position, a force can be applied to the shooting device, in particular the first or the second wall element, and the locking device is thereby released.

The position of the ejecting device, in particular of the driver element, can be detected and the electric motor can be controlled in dependence on the position of the ejecting device, in particular of the driver element.

An actuation of the ejecting device for driving in a fastener can be prevented when no fasteners are located in the magazine.

The magazine can have a preferably spring-loaded closure mechanism, which is opened only when the tool is pressed against a substrate. This property represents an important safety feature of the tool, which prevents a shot from being fired inadvertently. This is true above all in cases where the tool is moved frequently over a long period of time while the shooting device is held in the clamping position and thus would in principle be ready to fire.

The ejecting device can be movable in the direction toward the clamping position only when sufficient electrical energy for a driving-in procedure is stored in the electrical store. As a result, a sudden resetting of the ejecting device through discharging the mechanical energy store, which would occur when the electric motor is no longer supplied with electrical energy during movement of the ejecting device in the direction toward the clamping position, can be prevented. The kinetic energy released in this case, in the reverse acceleration, could damage the spindle drive, which is not designed for such high speeds.

BRIEF DESCRIPTION OF THE DRAWINGS

Further advantages and details of the invention are discussed, for various embodiment, with reference to the following figures, in which.

DETAILED DESCRIPTION OF THE INVENTION

Figure 1:
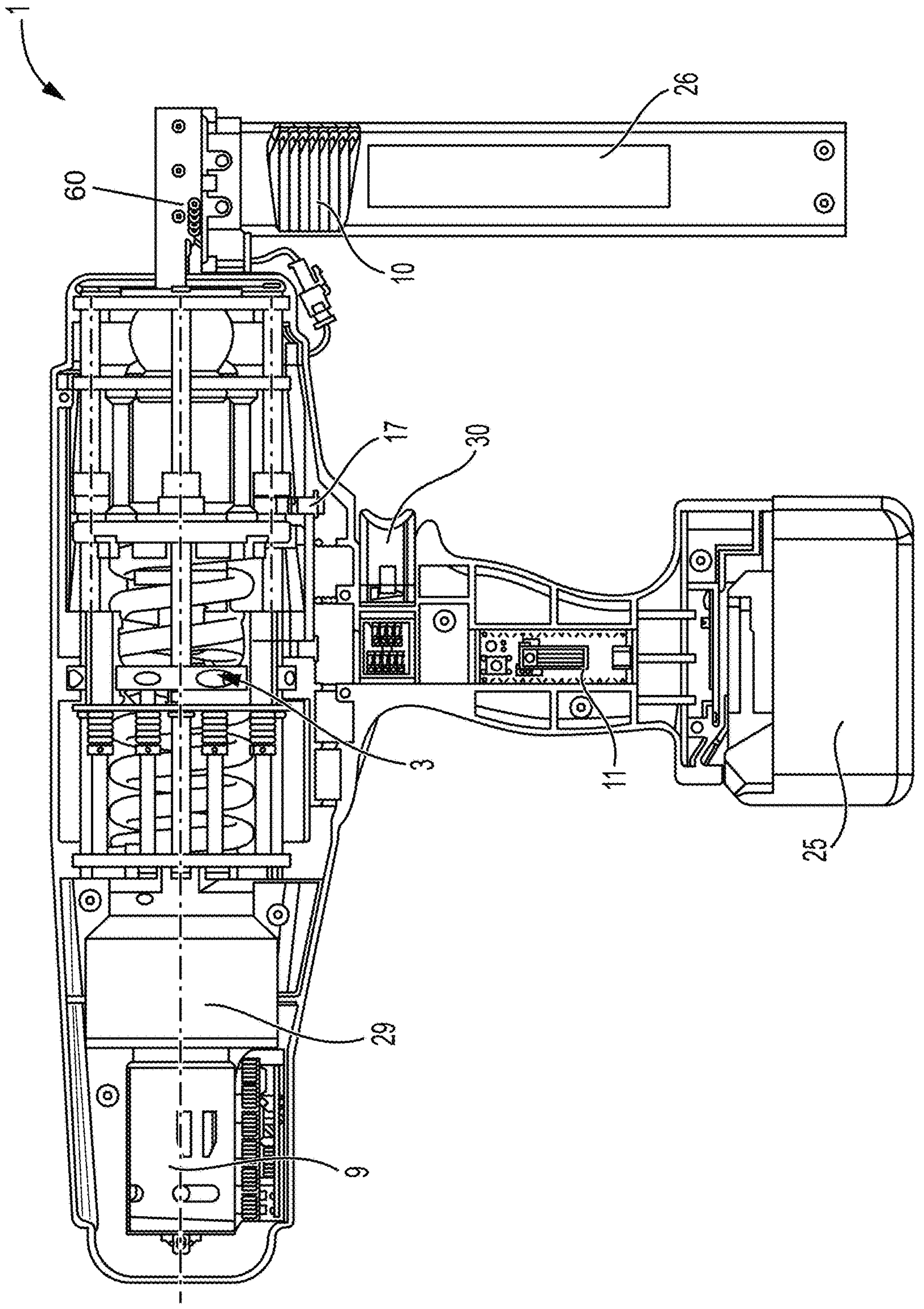
FIG. 1 is a side view of a tool according to the invention.

FIG. 1 shows an embodiment of the tool 1 according to the invention in a side view. In this case, the tool 1 is depicted without a cover in order to be able to see the interior. Here, the tool 1 or the ejecting device 5 is located in the ejecting position A and the mechanical store 3 is uncocked. In this embodiment, the mechanical store (mechanical energy storing element) 3 is formed as a helical spring. In order to cock the tool 1, the electric motor 9 drives the spindle drive 8 via a planetary gear 29. Through the movement of the spindle drive 8 in a first direction, the ejecting device 5 together with the shooting device 2 is brought, via the driver element 6, into the clamping position S, where the shooting device 2 is held by the locking device 7. The locking device 7 has a plurality of symmetrically arranged, rotatably mounted and spring-assisted catch elements 12.

After the shooting device 2 has reached the clamping position S, the direction of rotation of the spindle drive 8 is changed and the driver element 6 is moved back in the direction $R_A$ toward the ejecting position A. In this case, the movement of the electric motor 9 is controlled via the control device 11. Then, a shot is fired by pressing the push button 30. For this purpose, the driver element 6 is moved further in the direction toward the ejecting position A. As a result, the driver element 6 presses on the second wall element 15 of the shooting device 2, which causes a force F to be applied to the second wall element 15 and the shooting device 2. Through the movement of the driver element 6, the force F becomes greater and greater until finally the holding force of the locking device 7 is no longer sufficient to hold the shooting device 2 in the clamping position S. The locking is then released, and the energy stored in the mechanical store 3 is transferred suddenly to the shooting device 2, which for its part transfers this energy to the fastener 10 (staple in this case). Through the transfer of force from the shooting device 2 via the firing pin 23 to the fastener 10, the latter is driven into the substrate. The ejecting movement of the shooting device 2 is cushioned by the damper 22.

Three sensors 17 are incorporated for detecting the position of the shooting device 2. These are formed as SMD fork light barriers and detect whether the shooting device 2 is located in the clamping position S or in the ejecting position A. As a result, the position of the ejecting device 5 can also be determined after a possible interruption of the power supply. In addition, a sensor 17 detects whether the driver element 6 is touching the second wall element 15. After a shot has been discharged, the shooting device 2 is brought back into the clamping position S-in the event that fasteners 10 are available in the magazine 26 and there is sufficient electrical energy in the electrical store (electrical energy storing element) 25. After catching in place, the driver element 6 is moved in the direction $R_A$ toward the ejecting position A. As soon as the driver element 6 is in contact with the second wall element 15, this is detected by a sensor 17 and the driving by the electric motor 9 is stopped. Only an actuation of the tool 1 at a switch provided for this purpose, for example the push button 30, brings about a further movement of the driver element 6 and an application of a force F to the second wall element 15.

Both the barrel 27 and the magazine 26 are formed such that the magazine 26 can be detached from the barrel 27. The firing of a shot can be blocked by the safety plate 41 if the barrel 27 is not pressed against a substrate. This represents an important safety feature in order to prevent a shot from being discharged unintentionally or prematurely.

Figure 2:
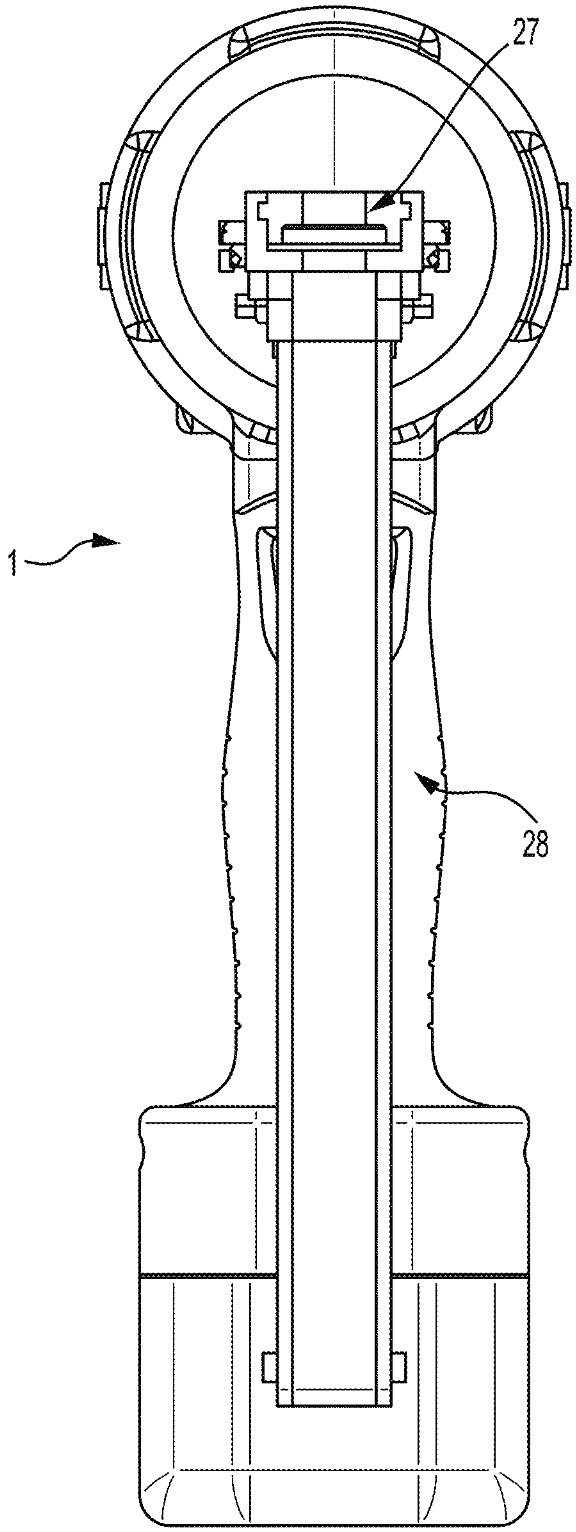
FIG. 2 is a front view of a tool according to the invention.

Furthermore, the tool 1 is equipped with an electrical store (electrical energy storing element) 25 in the form of a storage battery. FIG. 2 shows the tool 1 in a front view, wherein in comparison with FIG. 1 a sectional representation is not used, but rather the complete casing 28 is depicted. Furthermore, the barrel 27 and the magazine 26 of the tool 1 can be seen.

Figure 3:
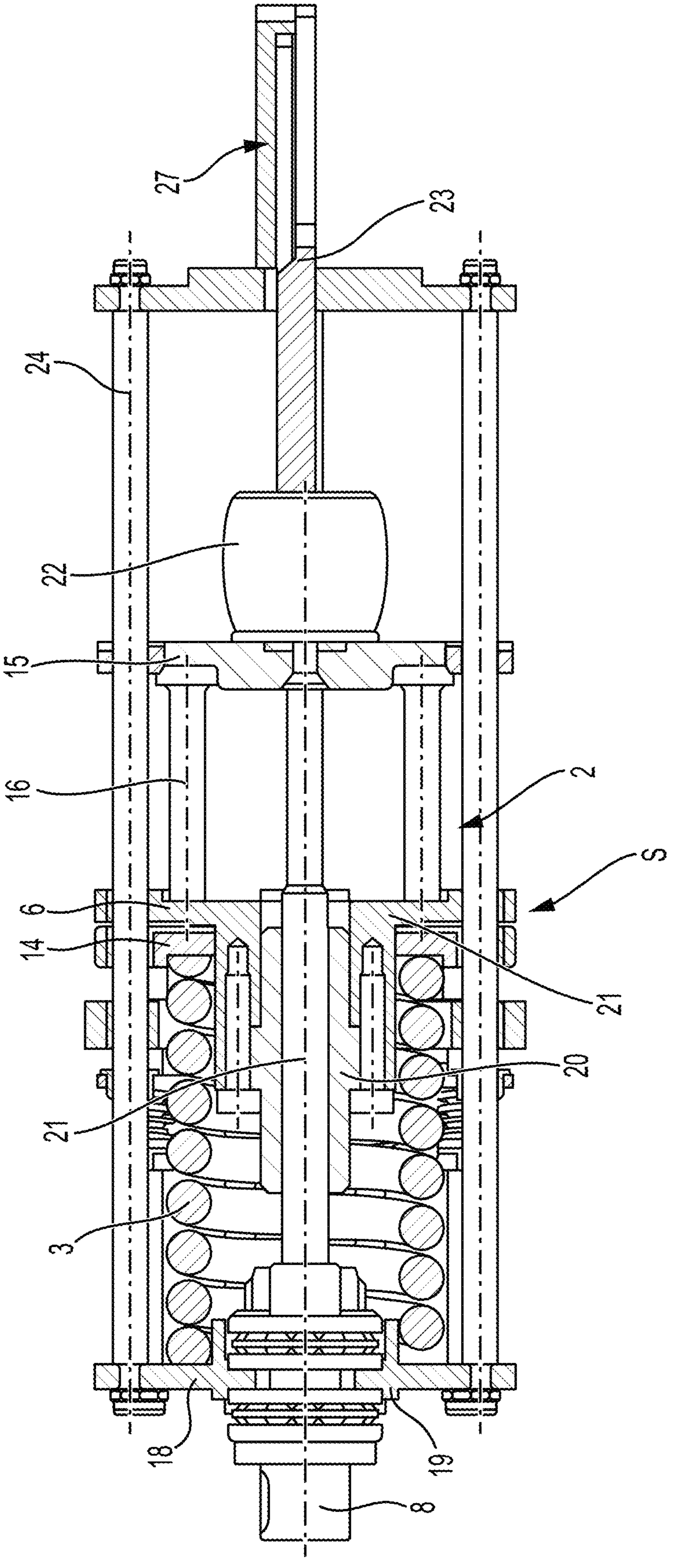
FIG. 3 is a cross-sectional representation of an embodiment of an ejecting device with spindle drive and guide device in the locked state with the driver element in the clamping position.

FIG. 3 shows the ejecting device 5 in the clamping position S. For this, the spindle drive 8 has been driven such that the driver element 6 has been moved via the spindle nut 20 in the direction $R_S$ toward the clamping position S, wherein the shooting device 2 is also drawn along via the tension disk 21. Here, the shooting device 2 is moved backwards via the guide device 4 and held by the locking device 7 after reaching the clamping position S. Here, the shooting device 2 consists of a first wall element 14, facing the clamping position S, and a second wall element 15, facing the ejecting position A. Both wall elements 14, 15 are formed such that they form a stop surface for the driver element 6, which comprises the spindle nut 20 and the tension disk 21. On its outside, the second wall element 15 has a damper 22 and a firing pin 23.

Here, the two wall elements 14, 15 are connected via support struts 16. The spindle drive 8 is mounted via axial bearings 31 in the bearing seat 19 at the rear end of the guide device 4 in the stop element 18 of the mechanical store 3. In this case, the stop element 18 acts as bearing seat 19.

Figure 4:
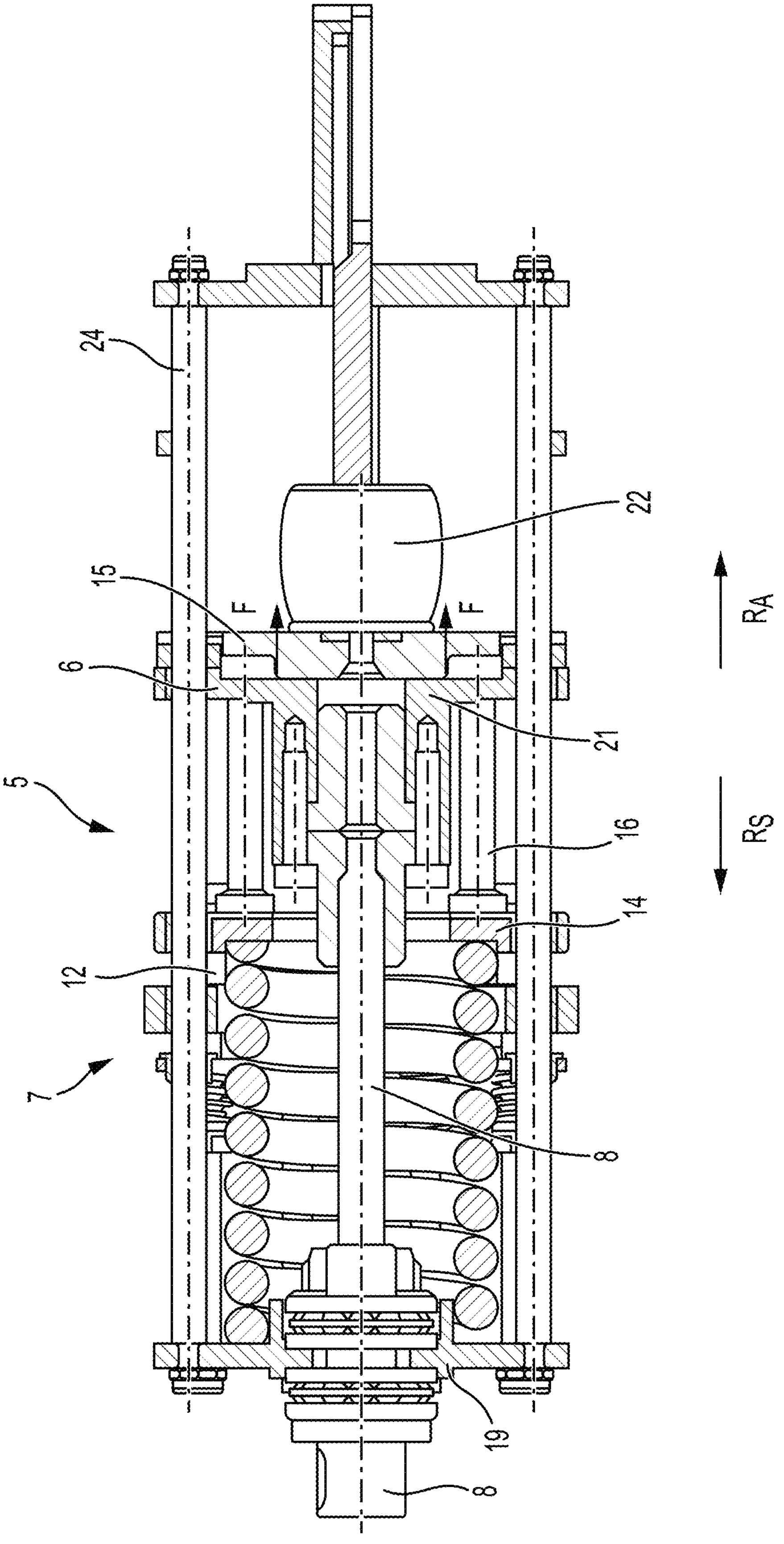
FIG. 4 is a cross-sectional representation of the above embodiment of the ejecting device with spindle drive and guide device in the locked state, wherein the driver element is moved in the direction toward the ejecting position.

FIG. 4 shows how the driver element 6 is moved back in the direction toward the ejecting position A after the locking. As soon as a particular force F is applied to the second wall element 15 via the driver element 6 and the holding force of the locking device 7 is no longer sufficient, the locking is released and the shooting device 2 is pressed suddenly in the direction $R_A$ toward the ejecting position A by the discharging mechanical energy store 3.

In FIG. 4, it can furthermore be seen that the first wall element 14 is formed annular in this embodiment. During the clamping procedure, the first wall element 14 is drawn in the direction $R_S$ toward the clamping position S by the spindle nut 20 and the tension disk 21 until it locks. The shot is then fired through movement of the driver element 6 in the direction $R_A$ toward the ejecting position A. The catch elements 12 of the locking device 7 are rotated outward through the application of the force F (represented symbolically by the two arrows F at the driver element 6) to the second wall element 15 by the first wall element 14, which is connected to the second wall element 15 via support struts 16, with the result that the locking releases. The firing of a shot can thereby be ruled out when the driver element 6 is not in the position provided for this. As a result, damage to the driver element 6 through an accidental firing at the wrong point in time can be prevented and a rapid discharge of a shot after a shot has been fired can be guaranteed.

Figure 5:
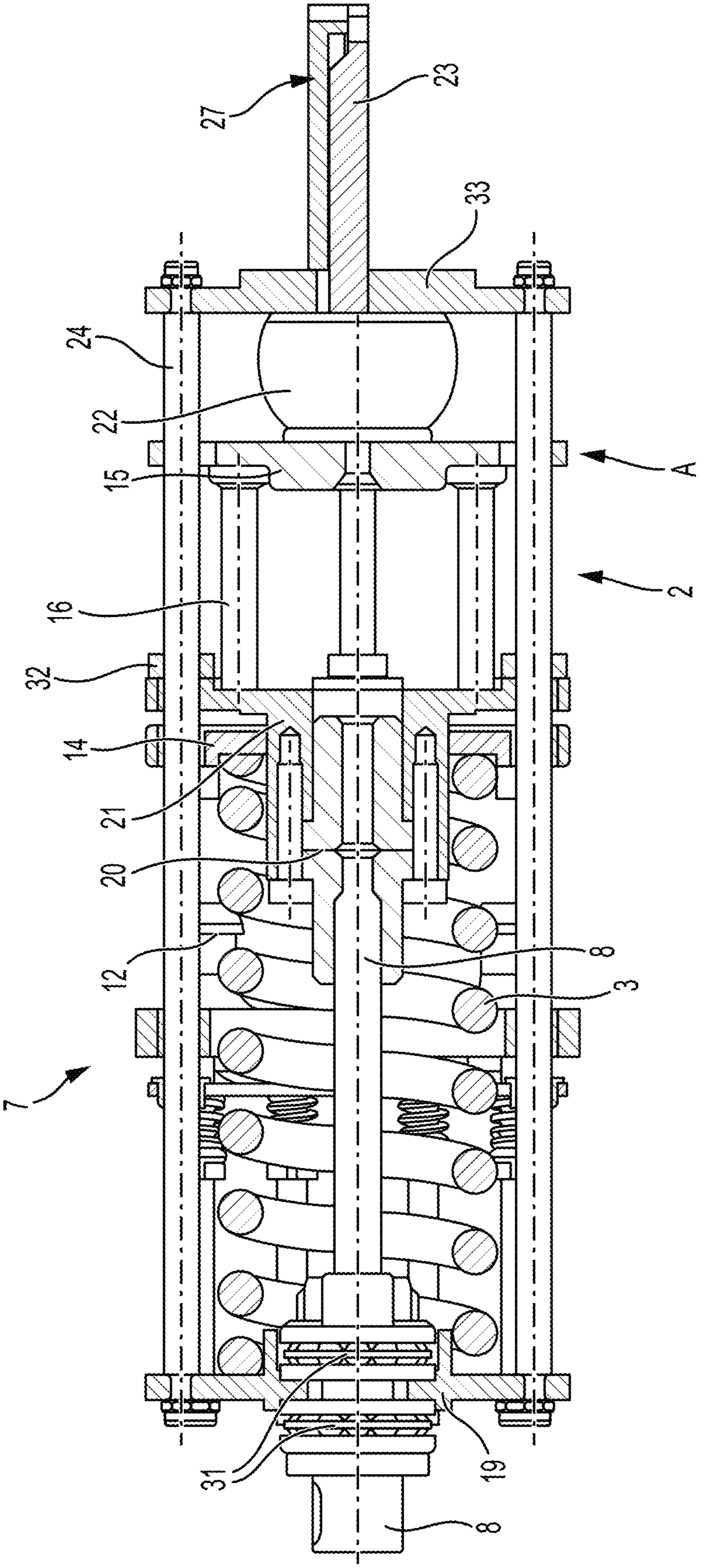
FIG. 5 is a cross-sectional representation of the above embodiment of the ejecting device after the locking is released.

The ejecting device 5 in the uncocked state in the ejecting position A is depicted in FIG. 5. The catch elements 12 have been released by a movement of the driver element 6 in the direction $R_A$ toward the ejecting position A, and the energy stored in the mechanical store 3 has been transferred via the firing pin 23 to the fastener 10. The damper 22 serves to cushion the sudden movement of the shooting device 2. For this, it is arranged on the outside of the second wall element 15 and is retarded by the firing pin seat 33. The movement of the tension disk 21 in the direction $R_A$ toward the ejecting position A is restricted by the position stop 32.

The symmetrical arrangement of the individual guide bars 24 of the guide device 4 can minimize the risk that the shooting device will wedge or jam. Through the symmetrical and coaxial construction of the ejecting device 5 together with the guide device 4 and the centrally arranged spindle drive 8, the occurrence of radial moments can also be prevented.

Figure 6A:
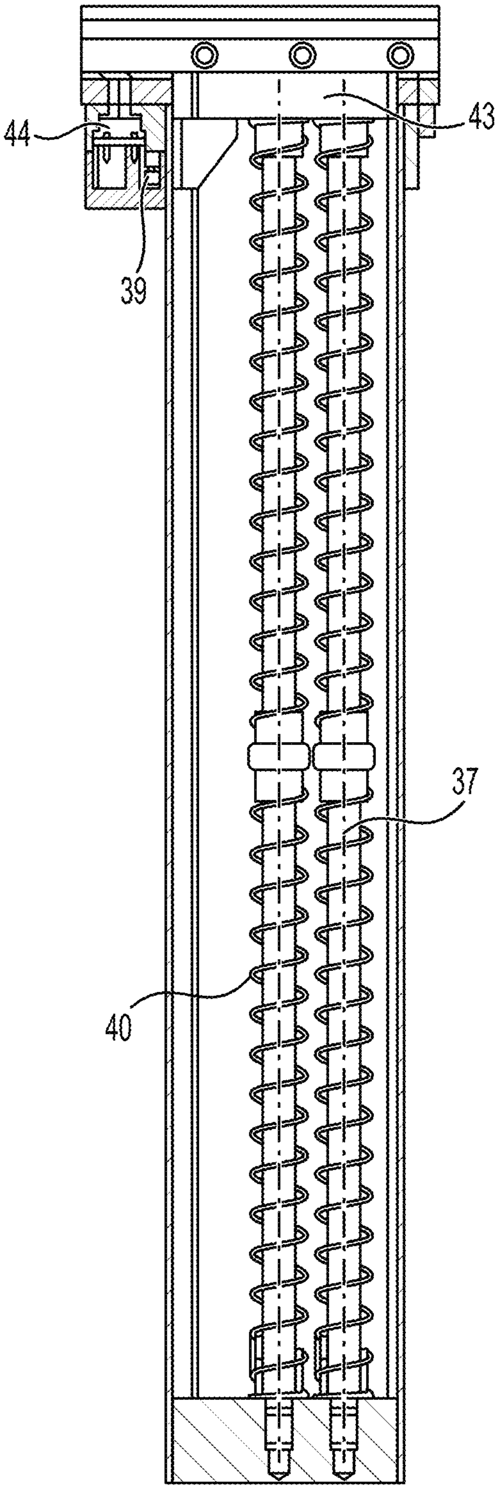
FIGS. 6*a* and 6*b* are a cross-sectional representation and a front view of an embodiment of a magazine, respectively.
Figure 6B:
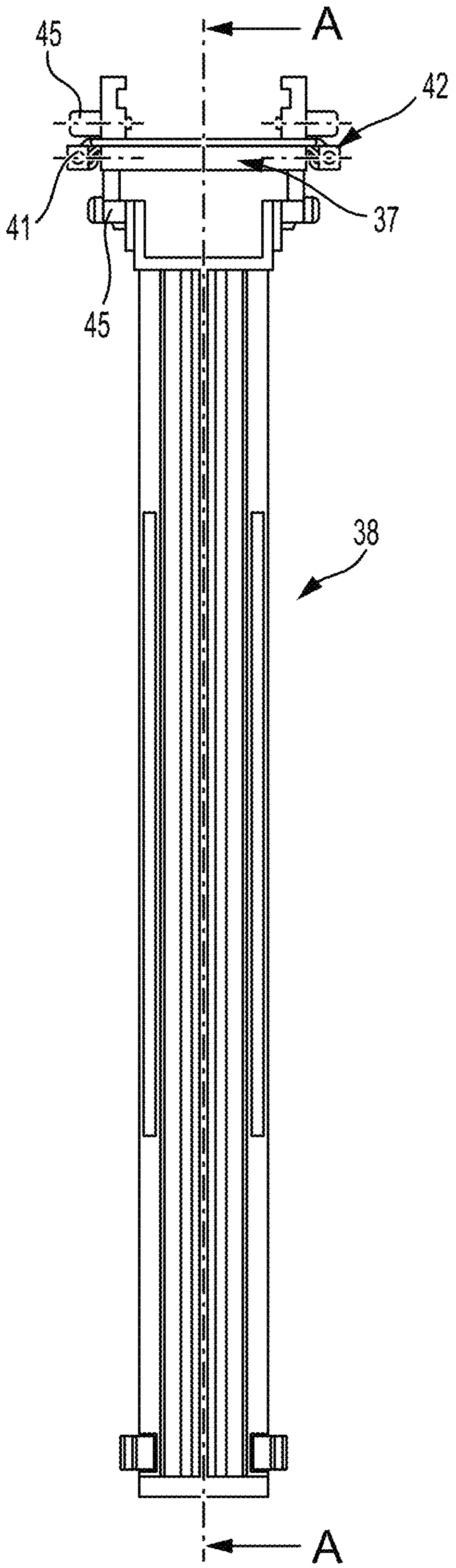

FIGS. 6*a* and 6*b* show the magazine 26 of the tool 1 in a cross-sectional representation along the section line A-A and in a front view. For servicing reasons, the magazine 26 is able to be detached from the barrel 27. In order that a shot can be discharged, the tool 1 must be pressed against a solid article (substrate) so that a spring-loaded closure mechanism 60 (see FIG. 1) including the safety plate 41, which is located between magazine 26 and barrel 27, is displaced backward. In the pushed-back state, the safety plate 41 makes it possible for a fastener 10 to pass into the barrel 27. In addition, when the plate is pushed back, an SMD short-stroke button 44 is activated, which enables a shot to be discharged by the push button 30 (not depicted in this figure). In order to move the safety plate back into the starting position after a shot has been discharged, it is connected to the magazine guide 37 with cylindrical tension springs 42. If the SMD short-stroke button 44 is activated, only one shot can be discharged and the tool 1 must be lifted off the substrate and replaced for another shot to be discharged.

The fasteners 10 are pressed in the magazine 26 along the magazine guide 37 by the cylindrical compression springs 40 in the direction toward the safety plate 41 and thus in the direction toward the barrel 27. If there are no more fasteners 10 in the magazine, another shot is prevented from being discharged through activation of the SMD toggle switch 39 by the thrust piece 43.

The position of the magazine 26 on the barrel 27 is ensured by sprung ball pressure pieces 45. In order to refill new fasteners 10 into the magazine 26, the magazine rail with base 38 can be separated from the magazine guide 37. In order to secure the position of the magazine rail 38 in the magazine guide 37, sprung ball pressure pieces 45 are used.

Figure 7A:
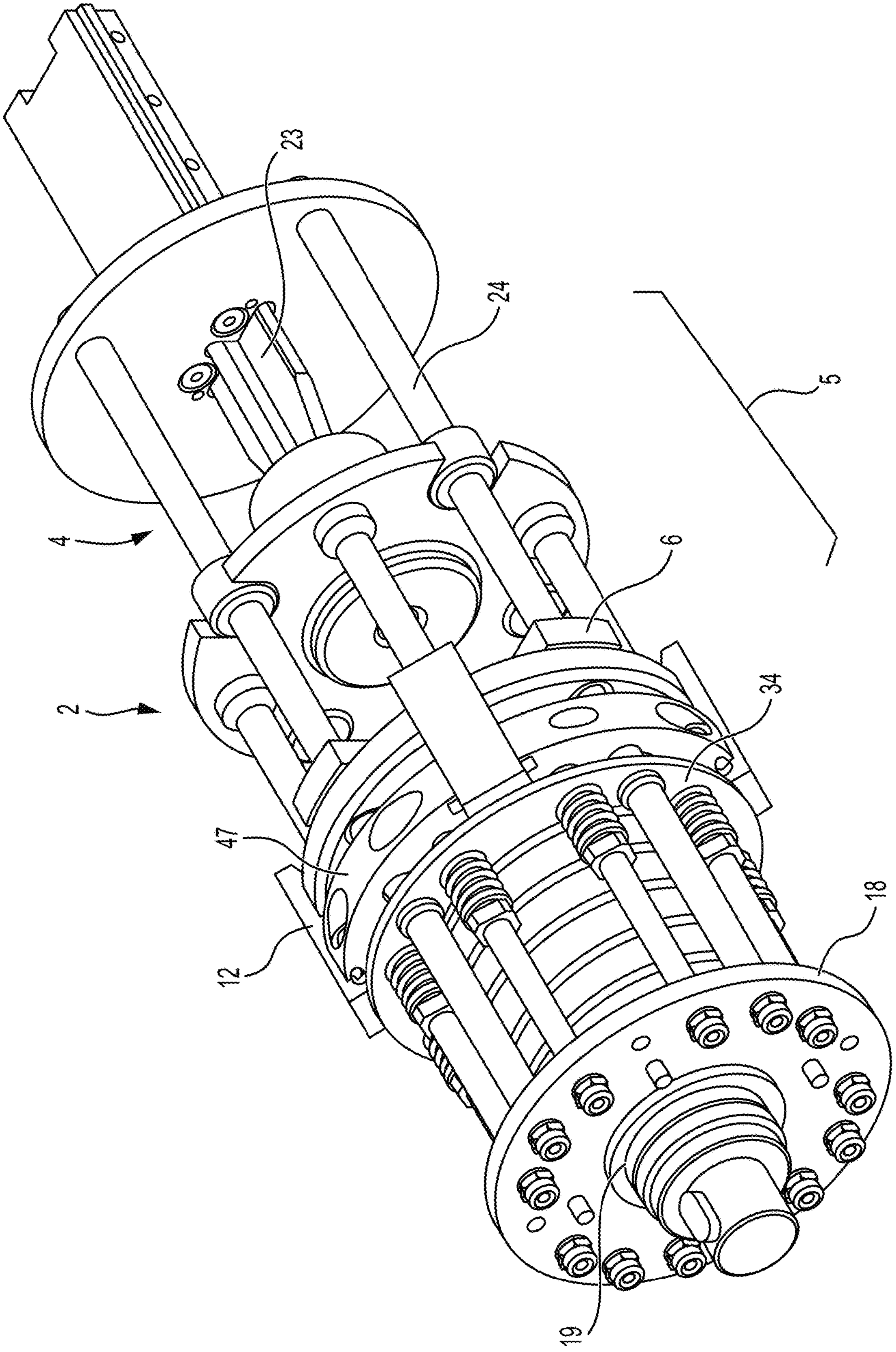
FIGS. 7*a* and 7*b* are perspective views of an embodiment of the ejecting device with spindle drive and guide device.
Figure 7B:
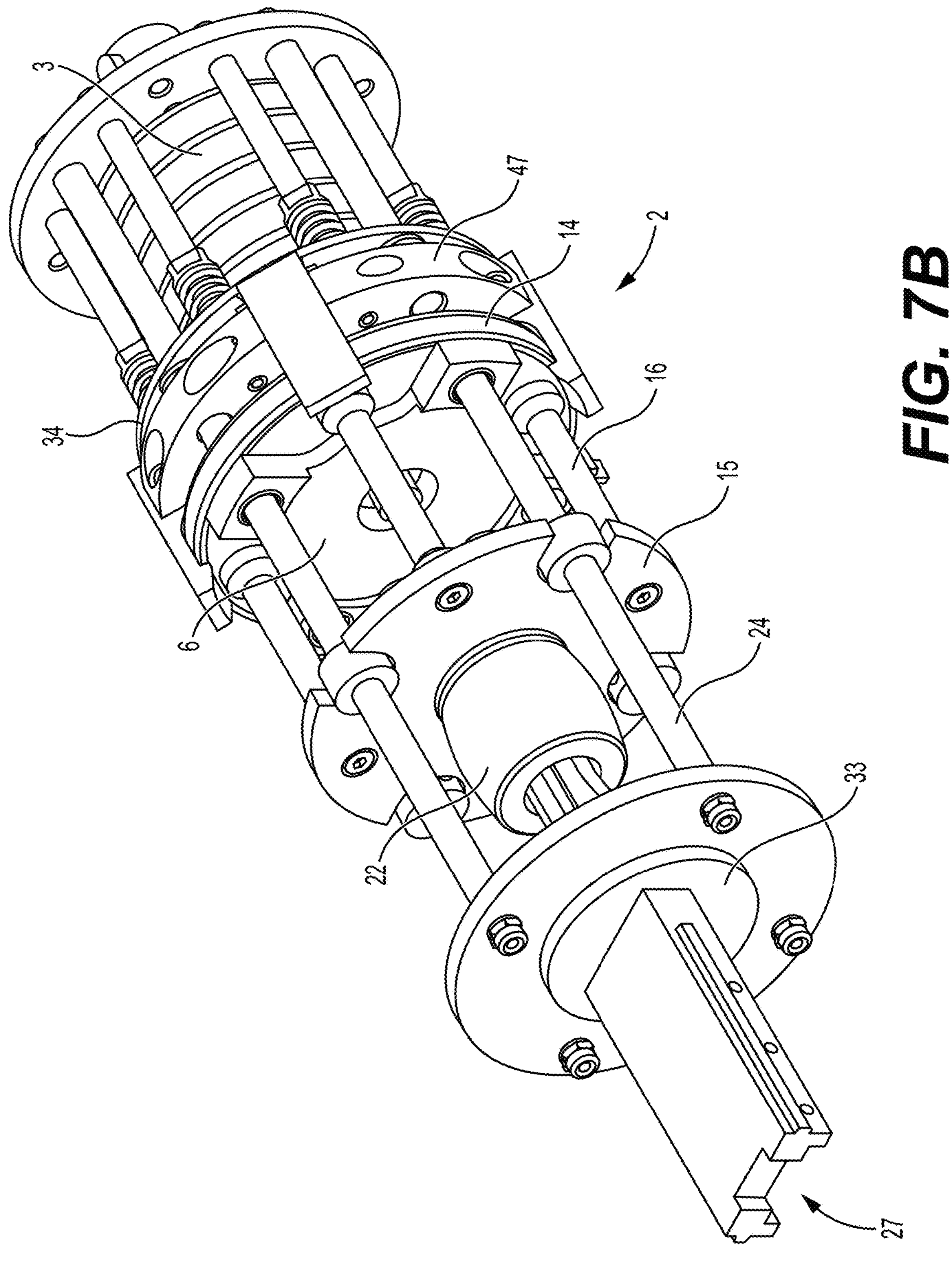

FIGS. 7*a* and 7*b* show two perspective views of the clamped ejecting device 5 of the tool 1 from different viewing angles. In this case, the driver element 6 is in the clamping position S. The spring-assisted catch elements 12 can be clearly seen in FIG. 7*a*. The release force can be set via a ring 34 acted on by springs. The catch elements 12 are arranged rotatably mounted on a bearing element 47. The further parts of the ejecting device 5 can be clearly seen in these views. The individual guide bars 24 of the guide device 4 are formed continuous from the firing pin seat 33 to the stop element 18 of the mechanical energy storage element 3 and form the guide for the ejecting device 5, which can be brought into the clamping position S via the spindle drive 8. The energy applied for this is stored in the mechanical energy store 3, here formed as a helical spring, until the shot is discharged. If the driver element 6 is then brought in the direction $R_A$ toward the ejecting position A, the shot can then be fired by applying a force F to the second wall element 15.

Figure 8:
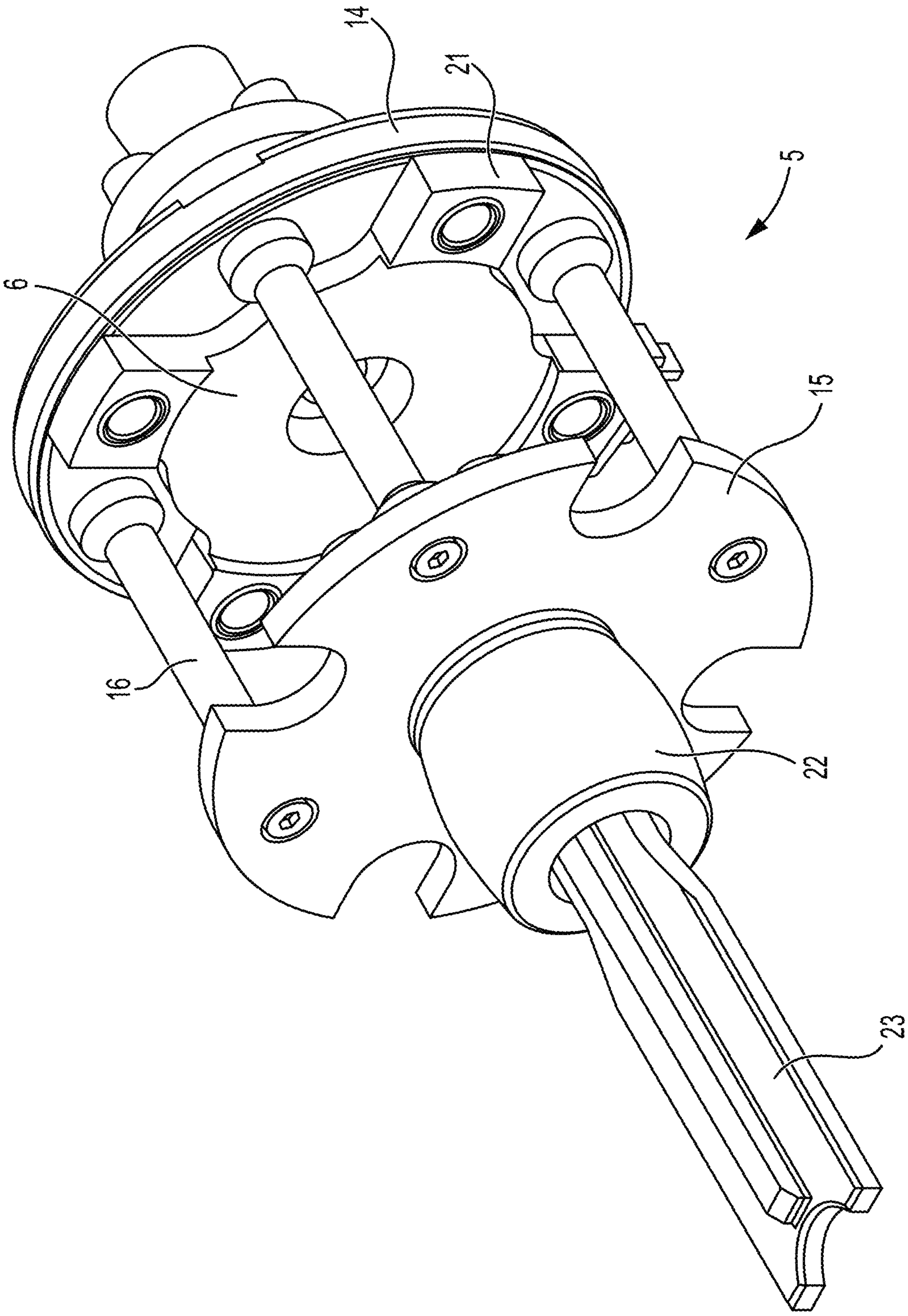
FIG. 8 is a perspective view of an embodiment of part of the ejecting device.

FIG. 8 shows a perspective detailed view of the ejecting device 5. The connection of the second wall element 15 to the damper 22 and the firing pin 23 can be clearly seen here. The driver element 6 touches the first wall element 14. This corresponds to the position during the clamping procedure, in which the ejecting device 5, in particular the shooting device 2, is moved in the direction $R_S$ toward the clamping position S. In this embodiment, four symmetrically arranged support struts 16 are provided between the first wall element 14 and the second wall element 15. The four likewise symmetrically arranged guide bars 24 of the guide device 4 lead through the open holes of the tension disk 21 and the first wall element 14.

Figure 9A:
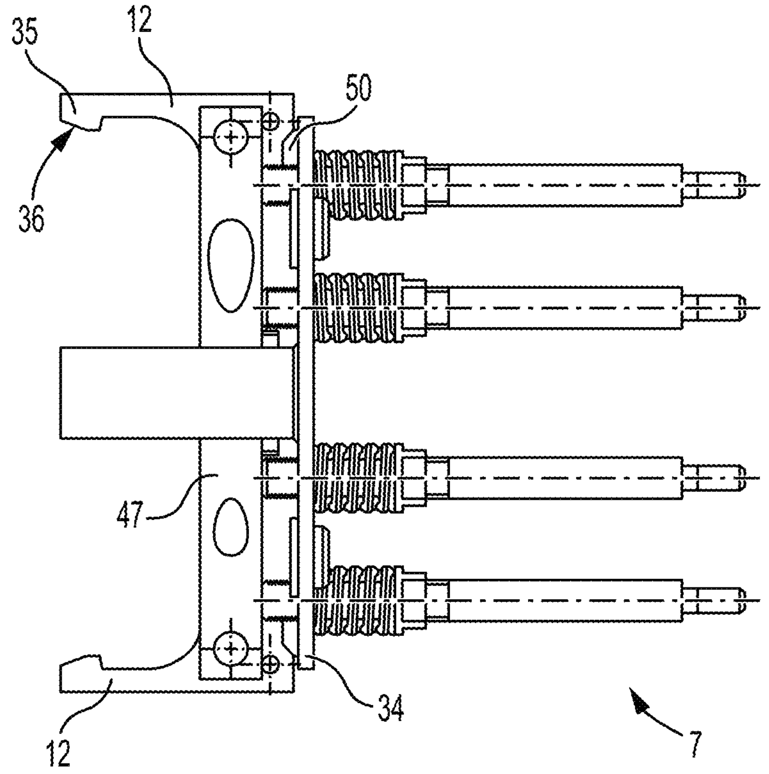
FIGS. 9*a* and 9*b* is a perspective view of an embodiment of the locking device.
Figure 9B:
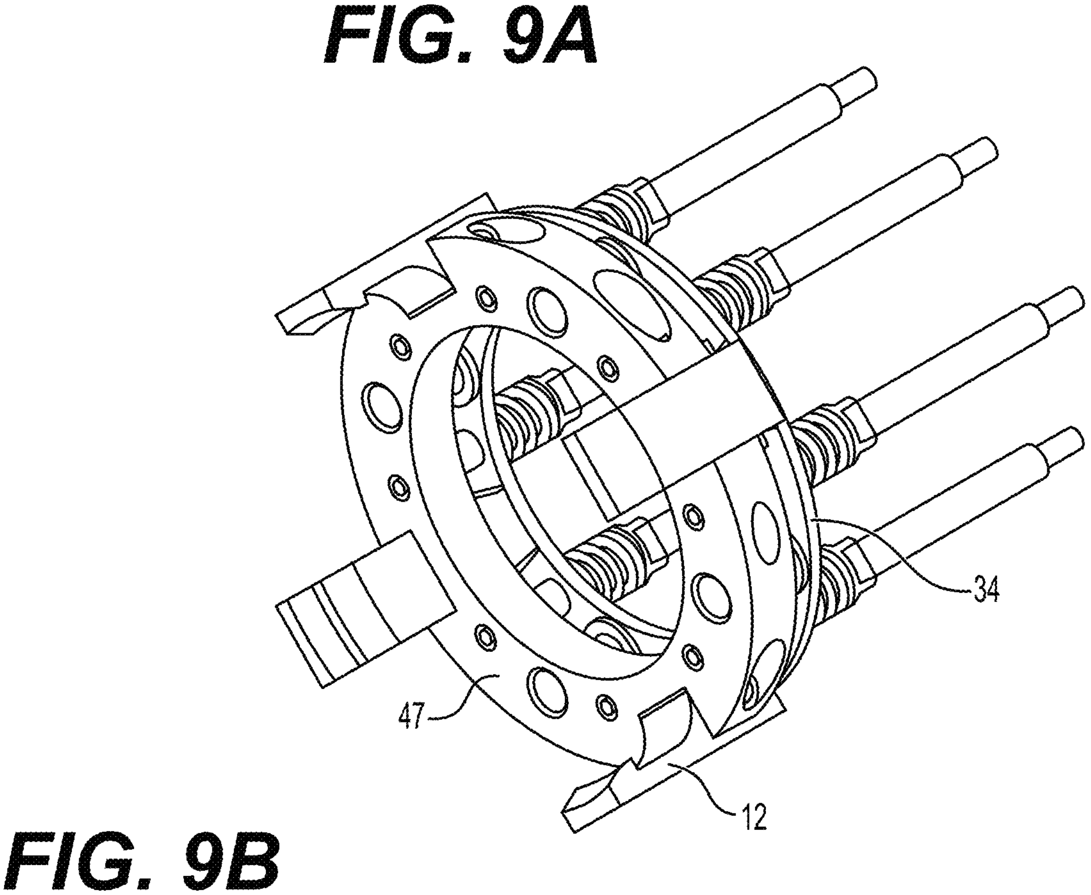

FIG. 9 shows a perspective view of the locking device 7. Here, four catch elements 12 are available for locking the shooting device 2. In this case, the ring 34 is pressed onto the catch elements 12 by several springs, as a result of which the release force is set.

Figure 10A:
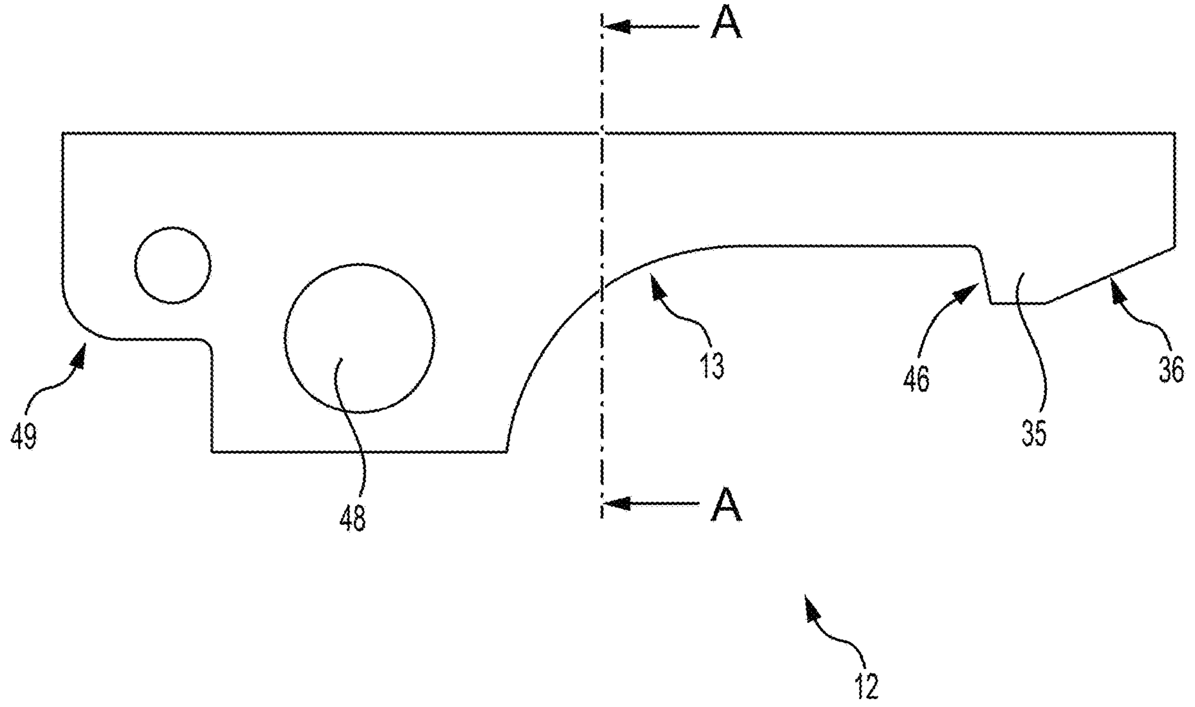
FIGS. 10*a* and 10*b* are a detailed representation with a cross-sectional representation of a catch element.

The precise shape of the catch elements 12 is represented in FIG. 10*a*. Here, an at least partially curved inner contour 13 with the detent 35 can be clearly seen. Alternatively, this region can also be formed in the shape of a bevel. The detent 35 arranged in the front region enables the shooting device 2 to be held securely in the clamping position S. As a result of the chamfered region 36 of the detent 35, the catching of the first wall element 14 during movement of the shooting device 2 in the direction $R_S$ toward the clamping position S is made easier. The bevel 46 makes it easier for a shot to be fired when the first wall element 14 exerts a force on the catch elements 12 due to the force F with which the driver element 6 presses on the second wall element 15. This force points, parallel to the spindle drive 8, from the curved inner contour 13 to the detent 35. Through this force, a friction force forms, which counteracts that force which would rotate the catch element 12, which is rotatably mounted in the larger of the two holes with the axis of rotation 48, downward when the first wall element 14 is moved in the direction $R_A$ toward the ejecting position A when a force F is applied by the driver element 6 to the second wall element 15.

In this case, the geometry of the bevel 46, in particular the angle relative to the perpendicular to the upper boundary surface of the catch element 12, can be chosen such that the locking by the locking device 7 does not act in a self-energizing manner. As a result, a rotation of the catch element 12 about its axis of rotation 48 due to a force being exerted in the direction toward the spindle drive is made easier. In the installed state, this perpendicular can be oriented in the direction toward the center of the shooting device 2, thus, e.g. toward the spindle drive 8. The angle relative to the perpendicular can e.g. be in a range between 0 and 30°, preferably 10°.

The catch elements 12 can furthermore have a curved outer contour 49, which make possible an easier rotation of the catch elements 12 when acted on by the ring 34. In this case, a region of the ring 34 can be provided with a bevel 50, as a result of which an even easier rotation of the catch elements 12 is made possible. Alternatively, it would also be possible to round off the region of the ring 34 and instead provide a corresponding bevel on that region of the catch elements 12 which is in contact with this region of the ring 34.

Figure 10B:
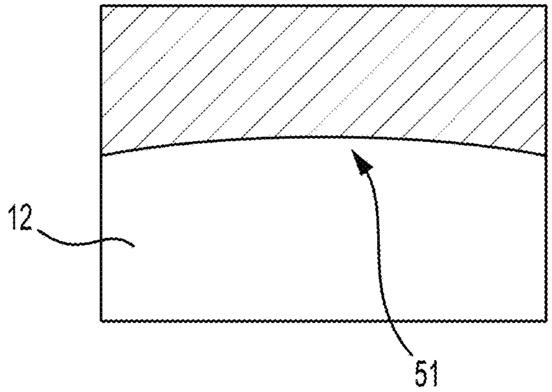

FIG. 10*b* shows a cross-sectional representation along the section line A-A. Here, it can be seen that the contour 51 is also formed curved in a plane perpendicular to the plane represented in FIG. 10*a*. This curved contour 51 serves for supporting the catch element 12 on the first wall element 14, having a corresponding curvature, and, together with the curved inner contour 13, for reinforcing the cross section of the catch element 12.

It is not absolutely necessary to form individual or all of the elements 14, 15, 18, 33, 34 and/or 47 substantially circular. A symmetrical construction of one or more of these elements can also be achieved by a polygonal outer contour, e.g. a hexagonal or an octagonal outer contour.

LIST OF REFERENCE NUMBERS

1 tool
2 shooting device
3 mechanical store
4 guide device
5 ejecting device
6 driver element
7 locking device
8 spindle drive
9 electric motor
10 fastener
11 control device
12 catch element
13 inner contour
14 first wall element
15 second wall element
16 support strut
17 sensor
18 stop element
19 bearing seat for spindle drive
20 spindle nut
21 tension disk
22 damper
23 firing pin
24 guide bars
25 electrical store
26 magazine
27 barrel
28 casing
29 planetary gear
30 push button
31 axial bearing
32 position stop
33 firing pin seat
34 ring
35 detent

36 chamfered region
37 magazine guide
38 magazine rail with base
39 toggle switch
40 cylindrical compression springs
41 safety plate
42 cylindrical tension springs
43 thrust piece
44 short-stroke button
45 sprung ball pressure pieces
46 bevel
47 bearing element for catch element
48 axis of rotation for catch element
49 curved outer contour
50 bevel
51 curved contour
60 spring-loaded closure mechanism
F force
S clamping position
A ejecting position
$R_S$ direction toward the clamping position
$R_A$ direction toward the ejecting position

The invention claimed is:

1. A tool for driving in a fastener, comprising:

a mechanical energy storage element for storing mechanical energy, an ejecting device configured to be linearly movable in a guide device between a clamping position and an ejecting position to transfer energy from the mechanical energy storage element to the fastener, wherein the ejecting device has a driver element and a shooting device, an electric motor and a spindle drive driven by the electric motor for converting a rotational movement of the electric motor into a linear movement of the ejecting device, wherein the driver element is connected to the spindle drive and is releasably coupled to the shooting device, a control device configured to control a direction of rotation of the electric motor, the ejecting device being movable in a direction toward the clamping position by rotation of the spindle drive in a first direction of rotation, and the mechanical energy storage element being loadable by the movement of the ejecting device in the direction toward the clamping position, a locking device configured to lock the shooting device in the clamping position, wherein the locking device is further configured to be actuated to release the shooting device so that the shooting device is movable in the direction toward the ejecting position, wherein the driver element is movable in the direction toward the ejecting position through rotation of the spindle drive in a second direction of rotation, and the locking device is configured to release the shooting device through the movement of the driver element in the direction of the ejecting position.

2. The tool according to claim 1, wherein the locking device has a rotatably mounted catch element for locking the shooting device in the clamping position.

3. The tool according to claim 2, wherein the catch element has a curved inner contour and/or curved contour and/or a curved outer contour and/or a detent on the side facing the mechanical energy storage element.

4. The tool according to claim 2, wherein the catch element is spring-assisted, spring-loaded, or resiliently mounted.

5. The tool according to claim 1, wherein the shooting device is cylindrical with a first wall element facing the clamping position and a second wall element facing the ejecting position, wherein the first wall element and/or the second wall element is has a stop surface for stopping the driver element, and the driver element is configured to apply a force to the stop surface for releasing the locking of the shooting device.

6. The tool according to claim 5, wherein the shooting device has a support strut via which the first wall element and the second wall element are connected to one another.

7. The tool according to claim 1, further comprising a sensor configured to detect the position of the ejecting device.

8. The tool according to claim 1, wherein the control device is configured such that the direction of rotation of the spindle drive is changed when a first position of the ejecting device is reached, and/or such that the electric motor is switched off when a second position of the ejecting device is reached.

9. The tool according to claim 1, further comprising a stop element for stopping the mechanical energy storage element, the mechanical energy storage element being arranged between the stop element and the shooting device.

10. The tool according to claim 9, wherein the spindle drive is mounted in the stop element.

11. The tool according to claim 9, wherein the guide device has a plurality of guide bars extending from the stop element in the direction toward the ejecting position.

12. The tool according to claim 11, wherein the guide bars are arranged outside the ejecting device.

13. The tool according to claim 1, wherein the spindle drive is arranged within a helical spring of the mechanical energy storage element.

14. The tool according to claim 1, wherein the spindle drive is centered in the ejecting device.

15. The tool according to claim 14, wherein the spindle drive is centered in the driver element and/or centered in the shooting device.

16. The tool according to claim 1, wherein the driver element is configured to be arranged in a helical spring of the mechanical energy storage element during movement in the direction toward the clamping position.

17. The tool according to claim 1, wherein the spindle drive has a spindle nut, and the driver element has a tension disk to be connected to the spindle nut, wherein the tension disk is arranged within the shooting device.

18. The tool according to claim 17, wherein the tension disk is arranged between the first wall element and the second wall element.

19. The tool according to claim 1, further comprising a damping element on an outside of the ejecting device to retard the shooting device.

20. The tool according to claim 19, wherein the damping element is on the second wall element.

21. The tool according to claim 1, wherein the shooting device has a firing pin configured to drive the fastener located in a launch position into a substrate.

22. The tool according to claim 1, further comprising an electrical energy storage element for driving the electric motor.

23. The tool according to claim 1, further comprising a magazine for storing a plurality of fasteners.

24. The tool according to claim 1, wherein the mechanical energy storage element comprises a helical spring.

25. A method for driving in fasteners with the tool according to claim 1, comprising:

moving the ejecting device using the spindle drive in the direction toward the clamping position for loading the mechanical energy storage element, holding the shooting device by the locking device when the clamping position is reached, and moving the driver element by the spindle drive in the direction toward the ejecting position for releasing the locking device.

26. The method according to claim 25, further comprising applying a force to a first wall element or a second wall element of the shooting device through a movement of the driver element in the direction toward the ejecting position so as to release the locking device.

27. The method according to claim 25, further comprising detecting a position of the driver element of the ejecting device, and controlling the electric motor depending on the detected position of the driver element of the ejecting device.

28. The method according to claim 25, wherein an actuation of the ejecting device for driving in the fastener is prevented when no fasteners are located in the magazine.

29. The method according to claim 25, wherein the magazine has a closure mechanism configured to be opened only when the tool is pressed against a substrate.

30. The method according to claim 29, wherein the closure mechanism of the magazine is spring-loaded.

31. The method according to claim 25, wherein the ejecting device is moved in the direction toward the clamping position only when sufficient electrical energy for a driving-in procedure is stored in the electrical energy storage element.

* * * * *